UNITED STATES PATENT OFFICE.

CARL RUDOLF STEINAU, OF NUREMBERG, GERMANY.

LITHOPONE-WHITE AND PROCESS FOR TREATING SAME.

955,918.  Specification of Letters Patent.  Patented Apr. 26, 1910.

No Drawing.  Application filed April 27, 1907. Serial No. 370,700.

*To all whom it may concern:*

Be it known that I, CARL RUDOLF STEINAU, a subject of the German Emperor, and a resident of Nuremberg, Germany, have invented a certain new and useful Improvement in Lithopone-White and Processes for Treating Same, of which the following is a specification.

It is well known that all commercial lithopone whites as now manufactured, blacken or at least become gray, when exposed to the action of the atmosphere and sunlight. While many theories have been advanced to account for this property of lithopone, the most plausible theory appears to be that such blackening is caused by the presence in the lithopone of zinc chlorid and cadmium chlorid. These compounds are formed during the heating in the manufacture of the product, as a result of the action of the chlorids of sodium or barium on the zinc or cadmium salts, the chlorids named being commonly added as adulterants.

The object of my invention therefore, is the provision of a process by which the lithopone is so treated that it resists perfectly the action of sunlight and the atmosphere, and will retain its white color.

My new process consists in treating the lithopone white, formed in the ordinary well known manner, with metallic carbonates easily yielding their carbonic acid, and with a suitable salt easily absorbing chlorin and oxygen. I have found that among other chemicals carbonate of magnesia combined with an alkaline earth nitrite or a nitrite of zinc or magnesium, is exceedingly efficient for this purpose and that also zinc-carbonate with metal oxids will produce good results. Magnesium carbonate or zinc carbonate used alone would not allow of the attainment of my purpose, but the addition of one of the nitrites mentioned, without the carbonate, furnishes a lithopone white resisting to an extraordinary degree the action of light. The addition of the carbonates, however, renders the action of the nitrites perfectly effective. The best results are obtained in the following manner: 100 parts of annealed and ground lithopone are treated in water with ½ to 5 parts of an alkaline earth or other nitrite as above mentioned and a similar amount of carbonate of magnesia at ordinary atmospheric temperature from 12 to 24 hours, or they are boiled by means of direct steam during 1 to 5 hours and longer while the liquid is continuously stirred; or they may be kneaded together at ordinary temperatures with a little water so as to form a homogeneous paste, which is then dried and ground. When operating the dry process 100 parts of lithopone as ordinarily found in commerce, is mixed with ½ to 5 parts of the alkaline earth or other nitrite and a similar amount of carbonate of magnesia.

The process is also suitable for lithopone containing calcium compounds.

In order to carry out one form of my process, the ordinary lithopone of commerce is converted into a paste by means of water and thoroughly mixed with from ½ to 5 per cent. of nitrite of barium, nitrite of magnesium, nitrite of zinc or the like alone or in combination with ½ to 5 per cent. of carbonate of magnesium, carbonate of zinc or the like. The quantities or percentage may be greater or less according to requirements. The mixture is then heated by steam during 1 to 5 hours, and is then dried or treated at the ordinary temperature during a correspondingly longer space of time that is to say 12 to 24 hours, and then dried. Or if desired lithopone in a dry state may be mixed with the desired nitrite, then mixed with carbonate of magnesia to which a little water has been added, and the resultant mixture dried and pulverized. When so made the resultant powder may be readily prepared for practical purposes in any quantities desired.

I am aware that the specification of the British Patent No. 7819 of March 31st, 1906, discloses a process according to which lithopone affected by the action of the light, is treated with those neutral salts of potassium and sodium which are adapted to precipitate zinc from solutions of its salts. The nitrites of the metals mentioned are however such neutral salts as are not capable of precipitating zinc from the solutions of its salts. The carbonates of magnesia and of zinc which I use, are neither compounds which are soluble in water, nor are they adapted to precipitate zinc from the solutions of its salts. They only act as agglomerating agents against the hygroscopic properties of the nitrites which are used in my process.

Having now fully described my said in- vention what I claim and desire to secure by Letters Patent is:

1. A process for treating lithopone white, which comprises treating the same with a nitrite of a metal.

2. A process for treating lithopone white, which comprises treating the same with a nitrite of a relatively light metal.

3. A process for treating lithopone white, which comprises treating the same with a nitrite of a relatively light metal and a carbonate of a metal.

4. A process for treating lithopone white, which comprises treating the same with an alkaline earth nitrite and a metallic carbonate.

5. A process for treating lithopone white, which comprises treating the same with an alkaline earth nitrite and an alkaline earth carbonate.

6. A process for treating lithopone white, which comprises treating the same with magnesium nitrite and magnesium carbonate.

7. A process for treating lithopone white, which comprises treating the same with magnesium nitrite and magnesium carbonate in the presence of water.

8. A process for treating lithopone white, which consists in adding $\frac{1}{2}$-5 parts magnesium nitrite and $\frac{1}{2}$-5 parts magnesium carbonate to 100 parts lithopone white, adding water to the mixture, and heating the same, substantially as described.

In testimony whereof I have hereunto set my hand in presence of two witnesses.

CARL RUDOLF STEINAU.

Witnesses:
BERNHARD FUCHS,
HERMANN DOEHLEMANN.